United States Patent
Pfeiffer

Patent Number: 5,295,293
Date of Patent: Mar. 22, 1994

[54] ARRANGEMENT AND METHOD FOR CLOSING OFF FLUID PASSAGES

[75] Inventor: Bernd Pfeiffer, Gross-Bieberau, Fed. Rep. of Germany

[73] Assignee: Alfred Teves GmbH, Frankfurt am Main, Fed. Rep. of Germany

[21] Appl. No.: 89,414

[22] Filed: Jul. 9, 1993

Related U.S. Application Data

[63] Continuation of Ser. No. 781,152, Oct. 31, 1991, abandoned.

[30] Foreign Application Priority Data

Mar. 1, 1990 [DE] Fed. Rep. of Germany ....... 4006368

[51] Int. Cl.$^5$ ............................................. B23P 19/02
[52] U.S. Cl. ...................................... 29/525; 29/509; 138/89
[58] Field of Search ............... 138/89, 40, 44; 251/191; 29/525, 509, 511, 515; 215/263, 266

[56] References Cited

U.S. PATENT DOCUMENTS

| | | | |
|---|---|---|---|
| 577,811 | 2/1897 | Tadder | 138/89 |
| 942,666 | 12/1909 | Romstaedt | 138/89 |
| 1,928,443 | 9/1933 | Archer et al. | 29/520 |
| 2,138,404 | 11/1938 | Haas | 29/520 |
| 2,518,165 | 8/1950 | Millard | 138/45 |
| 2,652,733 | 9/1953 | Gilda | 29/525 |
| 3,059,627 | 10/1962 | Dadd | 29/525 |
| 3,234,772 | 2/1966 | Fehling et al. | 29/509 |
| 3,350,768 | 11/1967 | Meylan et al. | 29/525 |
| 3,447,564 | 6/1969 | North et al. | 251/191 |
| 3,702,085 | 11/1972 | Hicok | 29/509 |
| 3,825,146 | 7/1974 | Hirmann | 138/89 |
| 3,851,668 | 12/1974 | Benjamin | 138/46 |
| 3,927,801 | 12/1975 | Martin et al. | 138/40 |
| 3,952,395 | 4/1976 | Crossman et al. | 138/89 |
| 4,463,597 | 8/1984 | Pierce et al. | 138/89 |
| 4,465,103 | 8/1984 | Humphreys | 138/40 |
| 5,042,679 | 8/1991 | Crowson et al. | 215/263 |

*Primary Examiner*—Harvey C. Hornsby
*Assistant Examiner*—James Hook
*Attorney, Agent, or Firm*—Robert P. Seitter; J. Gordon Lewis

[57] ABSTRACT

An arrangement and method for closing off fluid passages is disclosed. The arrangement includes first and second closure members inserted one behind the other in the fluid passage, the second closure member slidably fit into the passage with a clearance and positioning against a sealing shoulder in the fluid passage so that abraded particles caused by press fitting of the first closure member behind the second closure member can not get into the fluid passage.

3 Claims, 1 Drawing Sheet

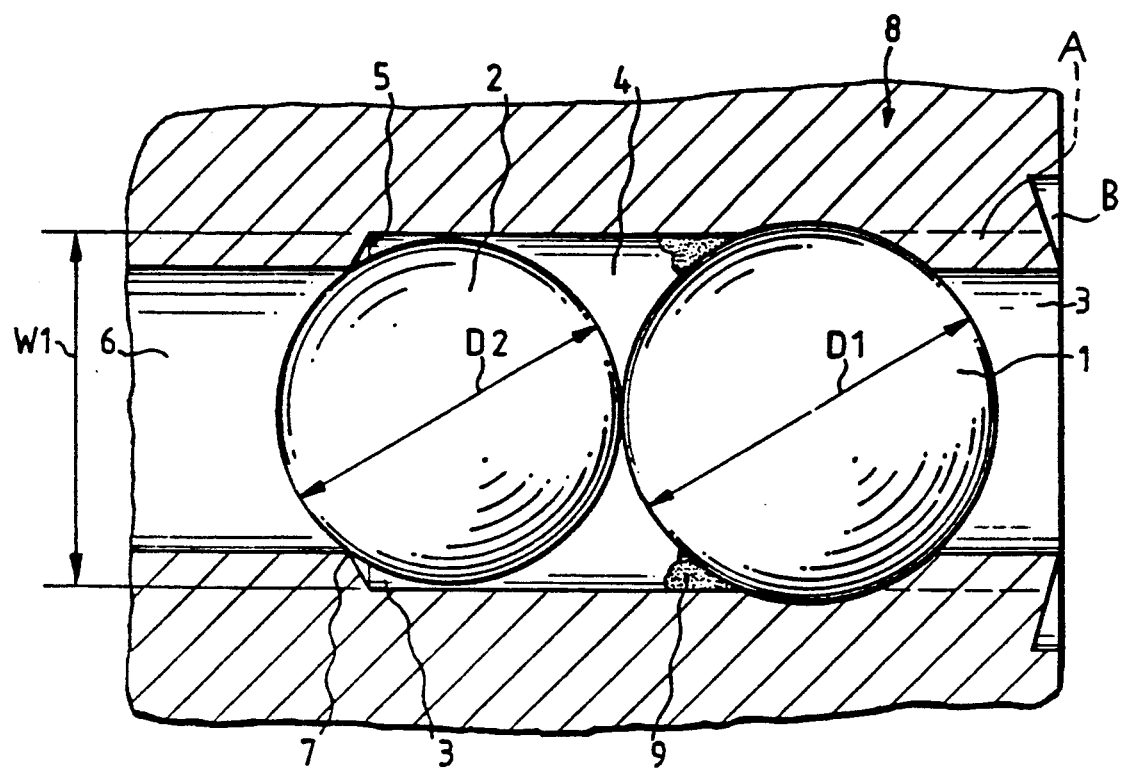

ARRANGEMENT AND METHOD FOR CLOSING OFF FLUID PASSAGES

This is a continuation of copending application Ser. No. 07/781,152 filed on Oct. 31, 1991 now abandoned.

BACKGROUND OF THE INVENTION

The present invention relates to a device for permanently closing off fluid passages formed in a housing.

Arrangements for permanently closing off fluid passages in hydraulic and pneumatic connectors and housings find many applications and hence are required in large quantities. Closing devices of the above-mentioned type are designed both as force-locking and form-locking elements. Screw-type, bayonet-type and press-type closing arrangements are generally known and widely employed which, admittedly, permit a satisfactory closure of the fluid passages. However, these devices entail disadvantages due to their complicated construction and/or assembly.

For instance, it is known from the illustration of German published patent application DE-OS 37 29 216 to block a fluid passage in a valve block by simply press fitting of a ball into an enlarged portion of the passage, and thereafter caulking the ball in place by upsetting of the passage wall which expedient is reliable and low in cost. This means of closing off a passage has the shortcoming that material is abraded by contact of surfaces of the ball with the surface defining the fluid passage, particularly for relatively soft valve block material during the press fitting. The abraded particles and chips can get into the fluid passage. In consequence of this undesirable effect, thorough rinsing operations are needed in order to eliminate the particles to safeguard the operability of solenoid valves or other sensitive components in the valve block assembly in later use.

Admittedly, it is already known to use so-called "king expanders", wherein a sleeve-shaped supporting body provided with claws is first inserted into the passage to be closed off, a ball is thereafter pressed into the supporting body in order to accomplish the necessary retaining force by expanding the supporting body. However, this closure mechanism still requires a significant assembly effort, and there is still some risk of abrasion particles entering the fluid passages. Also, the manufacturing costs are not minimized. Thus, there is a need for a particularly simple and absolutely reliable closing device.

Therefore, it is an object of the present invention to devise a closing arrangement which lends itself to ease of manufacture and absolutely reliably closes off a fluid passage with minimal mounting effort and without any possibility of releasing abrasion particles into the fluid passage.

SUMMARY OF THE INVENTION

The object of the invention is achieved in a surprisingly simple fashion by an arrangement according to the invention for closing off a fluid passage comprising a first and second closure members inserted one after the other in an enlarged portion of the fluid passage.

The first closure member is a press fit in relation to the enlarged duct portion and bears against the previously inserted second closure member, which is loosely fit into the enlarged fluid passage portion and is held against a sealing seat shoulder formed by the transition between the fluid passage and the enlarged portion thereof.

The overall dimension of the second closure member is slightly smaller than the overall dimension of the first closure member, the second closure member being provided with a clearance fit in relation to the enlarged fluid passage portion in order to be freely moved into abutment against the sealing surface of the shoulder.

A cavity is defined between the first and second closure members which serves to accommodate any particles abraded by press fitting of the first closure member, the particles prevented from entering the fluid passage by the sealing action of the second closure member against the shoulder.

It is particularly advantageous to use as closure members two precision steel balls of standard sizes which are arranged directly one behind the other in the enlarged portion of the fluid passage, the space between the balls permitting a sufficiently large cavity for receiving abraded particles.

Further advantages and features of this invention can be gathered from the description of an embodiment set out herein.

DESCRIPTION OF THE DRAWING

The FIGURE shows an arrangement according to the invention for closing off a fluid passage depicted on an enlarged drawing scale.

DETAILED DESCRIPTION

The FIGURE displays in cross-section the enlarged portion 3 of a fluid passage 6 formed in the housing 8. This enlarged passage portion 3 receives two aligned metal closure members 1, 2 here taking the form of steel balls. The first closure member 1 is pressed into the enlarged portion 3, held against the previously inserted second closure member 2.

A shoulder 5 is formed by the transition between the enlarged portion 3 and the main portion of the fluid passage 6, and the shoulder 5 forms a sealing seat or surface 7, on which the second closure member 2 is held in abutment by the pressure exerted by the first closure member 1. The seating of the second closure member 2 is intended to seal the fluid passage 6 against any escape of fluid. There is a loose or slidable clearance fit of the second closure member 2 in the enlarged portion 3, so that the pressure exerted by the first closure member 1 on the second closure member 2 insures that the sealing engagement of the second closure member 2 with the conical sealing seat surface 7 is accomplished to isolate the pressure fluid duct 6 and the cavity 4 enclosed in the enlarged duct portion 3 between the two closure members 1, 2.

As shown in the FIGURE, as a final step, the balls 1, 2 are "caulked", i.e., a tool (not shown) drives the material of the housing about the perimeter of the enlarged bore portion 3 so as to upset and reduce the diameter thereof in the region "A" behind the closure member 1 on the other side from the second closure member 2, the material driven against the other side of the one closure member 1 as shown to provide an additional fixing of the one closure member in the enlarged passage portion 3. The resulting tool impression is seen at "B".

The use of balls as closure members 1, 2 affords a simple centering and, simultaneously, good sealing of the second closure member 2 on the sealing seat surface 7 as well as reliable fixing of the first closure member 1 in the enlarged duct portion 3.

The cavity 4 defined by the boundary surfaces of the two closure members 1, 2 and the enlarged passage portion 3 can thus receive the solid particles abraded by pressing in of the first closure member 1. However, contamination of the pressure fluid duct 6 adjoining to the enlarged duct portion 3 is precluded by the isolating effect created by holding the second closure member on the sealing seat surface 7. At the same time, the in series arrangement of the two closure members 1, 2 provides double protection against pressure fluid leakage so that there is definitely a reliable sealing of the pressure fluid passage 6 in the housing 8.

To render the idea of our invention more distinct, the embodiment shows the combination of two closure members 1, 2 designed as ball elements. Other analogous embodiments relating to the design of the closure members 1, 2 are possible, although not here illustrated.

I claim:

1. A method of permanently sealing a fluid passage formed in a housing comprising the steps of:

forming an enlarged portion of said passage so as to create a shoulder at a transition between said fluid passage and said enlarged portion thereof;

inserting one closure member into said enlarged passage portion, said closure member being slidably fit therein, configured to have a sealing engagement with said shoulder;

thereafter pressing a metal closure member of a larger diameter than said enlarged portion of said passage into said enlarged passage portion and against said one closure member so as to press fit and permanently fix said metal closure member in said enlarged portion of said fluid passage, press fitting of said metal closure member abrading particles which are released into said enlarged portion of said passage, and engaging said one closure member with one side of said metal closure member as said press fitting thereof is carried out to force and fixedly hold said one closure member against said shoulder to establish said sealing engagement, whereby said sealing engagement of said one closure member with said shoulder prevents abraded particles produced by press fitting of said metal closure member moving past said transition and into said fluid passage.

2. The method according to claim 1 further including the step of configuring said closure members to create a cavity between said closure members with said one closure member forced and permanently held against said shoulder by said press fitting of said metal closure member.

3. The method according to claim 1 further including the step of driving the material about the perimeter of said enlarged portion of said passage to reduce the diameter thereof on another passage side of said metal closure member and against said another side thereof to provide an additional fixing of said metal closure element in said enlarged portion of said fluid passage.

* * * * *